United States Patent [19]

Fletcher, Jr. et al.

[11] 4,032,344

[45] June 28, 1977

[54] POLYSULFONAMIDE VESICULAR BINDERS AND PROCESSES OF FORMING VESICULAR IMAGES

[75] Inventors: George L. Fletcher, Jr., Pittsford; Stewart H. Merrill; Carl Kotlarchik, Jr., both of Rochester, all of N.Y.

[73] Assignee: Eastman Kodak Company, Rochester, N.Y.

[22] Filed: Dec. 29, 1975

[21] Appl. No.: 645,178

Related U.S. Application Data

[63] Continuation-in-part of Ser. No. 541,676, Jan. 16, 1975, abandoned.

[52] U.S. Cl. .............................. 96/48 HD; 96/49; 96/88; 96/75; 96/91 R; 96/91 N; 96/115 R
[51] Int. Cl.² .......................................... G03C 5/24
[58] Field of Search ............ 96/49, 88, 91 R, 91 N, 96/75, 48 HD, 115 R

[56] References Cited

UNITED STATES PATENTS

| | | | |
|---|---|---|---|
| 2,699,392 | 1/1955 | Herrick et al. ........................ 96/49 |
| 2,703,756 | 3/1955 | Herrick et al. ........................ 96/49 |
| 2,908,572 | 10/1959 | Schoew ................................ 96/49 |
| 2,923,703 | 2/1960 | Bruni et al. ........................... 96/49 |
| 3,032,414 | 5/1962 | James et al. ....................... 96/91 R |
| 3,208,850 | 9/1965 | Daech ................................ 96/91 R |
| 3,260,599 | 7/1966 | Lokken ................................ 96/75 |
| 3,355,295 | 11/1967 | Priest ................................. 96/91 R |
| 3,383,213 | 5/1968 | Notley et al. ......................... 96/49 |
| 3,620,743 | 11/1971 | Notley ................................ 96/91 R |
| 3,622,335 | 11/1971 | Notley ................................ 96/75 |
| 3,622,336 | 11/1971 | Notley ................................ 96/75 |
| 3,759,711 | 9/1973 | Rauner et al. ......................... 96/75 |
| 3,890,152 | 6/1975 | Ruckert et al. .................. 96/115 R |
| 3,929,489 | 12/1975 | Arcesi et al. .................... 96/115 R |

FOREIGN PATENTS OR APPLICATIONS

| | | |
|---|---|---|
| 2,352,348 | 10/1973 | Germany |
| 645,825 | 11/1950 | United Kingdom |
| 1,353,542 | 5/1974 | United Kingdom |

OTHER PUBLICATIONS

*Research Disclosure*, vol. 131, No. 13107, Mar. 1975, pp. 20–23.

*Primary Examiner*—Charles L. Bowers, Jr.
*Attorney, Agent, or Firm*—Dana M. Schmidt

[57] ABSTRACT

A light-sensitive vesicular imaging composition comprising a vesiculating agent which liberates gas upon exposure to activating radiation, and a binder which is a sulfonamide polymer having the sulfur-nitrogen linkage either in the polymer chain or as a pendant moiety. The composition is coated as a thin film. Imagewise irradiation of the element causes gas bubbles to be released in the exposed areas, which bubbles may be developed by overall heating to a visible record.

19 Claims, No Drawings

POLYSULFONAMIDE VESICULAR BINDERS AND PROCESSES OF FORMING VESICULAR IMAGES

RELATED APPLICATIONS

This application is a continuation-in-part of U.S. Ser. No. 541,676 filed on Jan. 16, 1975, entitled "Polysulfonamide Vesicular Binders", now abandoned.

BACKGROUND OF THE INVENTION

1. Field of the Invention

The invention relates to the photographic process known as vesicular imaging, and to the imaging element used therein. In particular, it concerns novel binders which contain, in layer form, the radiation-sensitive vesiculating agent which imagewise decomposes to form microscopic lightscattering vesicles of gas in the binder. Vesicular films are of considerable importance in information storage and retrieval, such as by microfilming, due to the facts that vesicular images have very high resolution, and are stable in ambient light and normal use temperatures. Further, since vesicular film has a low infrared absorption, it is superior to silver transparencies, as noted in Kosar, *Light Sensitive Systems*, p. 280 (1965). Particularly such is the case when the original image is reduced, as in microfilming, by a factor greater than 25 times.

2. State of the Prior Art

The first commercial vesicular photographic materials utilized gelatin binders. Gelatin was replaced with improved binder materials due to the undesired tendency of gelatin to absorb moisture and therefore to release the image-forming bubbles, destroying the image. Typical improved materials included a great variety of synthetic polymers, such as poly(vinyl chloride), poly(vinylidene chloride), and polystyrene; and copolymers obtained by copolymerizing acrylonitrile with vinyl chloride, styrene, vinylidene chlorofluoride, or 1,1-difluoroethylene; by copolymerizing vinyl chloride with methyl acrylate, acrylic acid, diethyl maleate, or vinyl acetate; or by copolymerizing vinylidene chloride with vinyl chloride, vinyl acetate, vinyl alcohol, ethyl acrylate, or acrylonitrile. Examples of the homo- or co-polymerization of vinylidene chloride are described in U.S. Pat. No. 3,032,414, issued to R. James.

To be suitable, a binder must be sparingly permeable, must have the proper diffusivity for the light-generated gas, and must have the proper rigidity for generating the imageforming vesicles. Of these 3 characteristics, permeability and diffusivity are approximately proportionate, and even rigidity is related to permeability, as is noted in the aforesaid U.S. Pat. No. 3,032,414. Thus, it is generally sufficient to evaluate only the permeability constant (PC) of a material to determine if the material is satisfactory as a binder. This constant is most readily expressed as PC, equal to the number of cubic centimeters of gas transmitted by 1 sq. centimeter of the binder material during one second at constant temperature, when the pressure gradient is one centimeter of mercury per centimeter of the thickness of the binder layer, or $cm^3 \cdot cm^{-2} \cdot sec^{-1} \cdot (cm. Hg/cm)^{-1}$. It has been established that the binder should have a PC of between about $1 \times 10^{-11}$ as $PC_{max}$, and about $1 \times 10^{-15}$ as $PC_{min}$, at a temperature of 30° C. See, for example, U.S. Pat. No. 3,355,295 to Priest. These limits appear to be useful regardless of the gas involved in the vesicular image formation.

The previously-described binder comprising a copolymer of vinylidene chloride and acrylonitrile, as particularly set forth in said U.S. Pat. No. 3,032,414, meets the above-stated range for PC. However, at normal temperatures the copolymer tends to release hydrogen chloride, which corrodes the metal commonly used in storage containers for the photographic element made therefrom.

The undesirability of vinylidene chloride has been solved in part by the use of α-chloroacrylonitrile as the predominating (by weight) comonomer, examples of which are taught in U.S. Pat. Nos. 3,620,743, 3,622,335 and 3,622,336 issued to Notley. However, vesicular imaging materials using these binders have exhibited lower sensitivity than similar materials using binders of the invention. (See Examples 16–18 below.).

Still other examples of binders include polyamides, such as those disclosed in U.S. Pat. No. 3,383,213 issued to Notley et al. However, as will be shown in the Examples below, these binders do not give reproducible vesicular imaging results, possibly because of improper permeability.

Other patents pertaining principally to the general background and development of the field of vesicular imaging elements include U.S. Pat. Nos. 3,260,599 issued July 12, 1966, 3,208,850 issued Sept. 28, 1965, 2,923,703 issued Feb. 2, 1960, 2,703,756 issued Mar. 8, 1955, and 2,699,392 issued Jan. 11, 1955.

Patent disclosures already published and pertaining to sulfonamide polymers used, however, other than as vesiculating binders, include British Patent Specification No. 1,353,542 and German Offenlegungsschrift No. 2,352,348.

OBJECTS OF THE INVENTION

In view of the aforementioned problems of prior art materials, it is an object of the invention to provide vesicular imaging elements and processes which are noncorrosive and which provide enhanced sensitivity.

It is a related object of the invention to provide vesicular elements which are not affected by humid storage conditions and which demonstrate improved image stability.

Other objects and advantages will become apparent upon reference to the following Summary of the Invention and Discussion of the Preferred Embodiments.

SUMMARY OF THE INVENTION

The invention concerns an improved vesicular imaging element and process utilizing a binder which is noncorrosive and demonstrates enhanced sensitivity.

More specifically, there is provided an improved vesicular imaging element comprising a water-insoluble thermoplastic, polymeric binder having a gas permeability constant ranging from about $1 \times 10^{-11}$ to about $1 \times 10^{-15}$, and dispersed in the binder a radiation-decomposable vesiculating agent capable of generating a gas upon imagewise exposure. The improvement is that the binder is a sulfonamide polymer having in the backbone or pendant therefrom, the moiety —$SO_2$—N<, the polymer further having the property that the wavelength of maximum absorption (λmax) is no greater than about 350 nm, in the spectral range of 200 to 750 nm.

The process of the invention then comprises the step of imagewise exposing the aforesaid element to activating radiation, and developing the exposed element by heating it to a temperature and for a time sufficient to force the gas bubbles formed by the photodecomposition of the agent to expand to form a visible image.

DESCRIPTION OF THE PREFERRED EMBODIMENTS

Although the particular embodiments of vesicular imaging materials hereinafter described are directed to nitrogen-releasing compounds, it will be readily appreciated that other well-known gas-releasing agents are equally usable with the binders of the invention, such as ferric ammonium citrate; polyketones and the like.

The element of the present invention comprises a support and coated on at least one surface of the support, a layer comprising binder and a vesiculating agent. Any conventional photographic support can be used in the practice of this invention. Typical supports include transparent supports, such as film supports and glass supports as well as opaque supports, such as metal and photographic paper supports. The support can be either rigid or flexible. The most common photographic supports for most applications are paper or film supports, such as poly(ethylene terephthalate) film. Suitable exemplary supports are disclosed in *Product Licensing Index*, Vol. 92, Dec. 1971, Publication 9232, at page 108. The support can incorporate one or more subbing layers for the purpose of altering its surface properties so as to enhance the adhesion of the radiation-sensitive coating to the support. A typical example of a subbing material is the terpolymer of vinylidene chloride, acrylonitrile, and vinyl chloride.

Any of the well-known radiation-sensitive compounds may be employed as the vesiculating agent. The primary criterion is that the compound be sensitive to light such that it decomposes upon exposure to light to form a gas. The most common of these materials are the so-called diazonium salts and azides, which release $N_2$. Of these, particularly useful embodiments include p-(diethylamino)benzenediazonium fluoroborate; 1,4-dicarbazidobenzene; 2-carbazido-α-naphthol; and 2,5-dimethoxy-4-morpholinobenzenediazonium hexafluorophosphate. Other suitable examples include 4-dimethylaminobenzenediazonium and 4-diethylaminobenzenediazonium chlorozincate; 4-phenylaminobenzene diazonium sulfate, 4-(N-ethyl-N-hydroxyethylamino)benzene diazonium tetrachlorozincate; 1-diazo-2-hydroxynaphthalene-4-sulfonate; 4-benzoylamino-2,5-diethoxybenzenediazonium chloride; 4-cyclohexylamino-3-methoxybenzenediazonium -p-chlorobenzenesulfonate; 7-dimethylamino-8-methoxy-3-oxodihydro-1,4-thiazine-6-diazonium chloride; 4-dimethylamino-1-naphthalenediazonium fluoroborate; 3-oxo-7-dialkylaminobenzothiazinediazonium fluoroborates; 1-carbazido-2:5-dihydroxybenzene; 2-amino-1-carbazidobenzene; 1,4-dicarbazido-2,3-dihydroxyfurane; p-diethylamino benzenediazonium chloride; 4-dimethylaminonaphthalene-1-diazonium chloride; ethylene bis(4-azidobenzoate); 4-azidoacetophenone; 2,6-bis(p-azodibenzylidene)-4-methylcyclohexanone; 2,4-diazido-6-methylpyrimidine; 4-azido-6-methyl-1,2,3,3a,7-pentaazaindene; 3- or 4-azidophthalic anhydride; and quinonediazides. All of these agents are so well known that further description of their photodecomposition process and use is unnecessary. The agent can be used in concentrations of between about 1 and 15 % of the weight of the binder.

It is not clear whether the vesiculating agent is dispersed, or actually dissolved in, the binder of the invention when finally coated as an element. It is clear, however, that either form of the coating will work sufficiently.

In accordance with one aspect of the invention it has been discovered that certain polymeric binders having the group >N—SO$_2$— as a portion of the polymer backbone or as a pendant moiety possess the proper permeability constant for vesicular imaging and also produce enhanced sensitivity in vesicular photographic elements. Thus it has been found that any sulfonamide polymers of this type are suitable, provided that the wavelength of maximum absorption of the binder, λmax, is no greater than about 350 nm in the spectral range of 200 to 750 nm, and preferably lower than 300 nm. It has been determined that higher λmax tends to produce colored binders which interfere with the absorption of the light that is necessary to decompose the vesiculating agent. Particularly useful classes of such polymers include polymers containing toluene-2,4-disulfonamide units and those containing N-(vinylphenyl)sulfonamide units. The binders of the invention can be homopolymers, copolymers, or physical mixtures of the same. Whether the polymer is an addition polymer or a condensation polymer, a minimum portion of the polymer should be recurring sulfonamide groups such as —SO$_2$N< groups, so that the weight percent of sulfur is at least about 4%.

One useful class of condensation polymers is those having recurring units conforming to Structure (I):

$$-D-|-E- \quad (I)$$

wherein —D— has the structure:

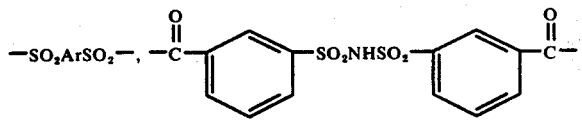

or

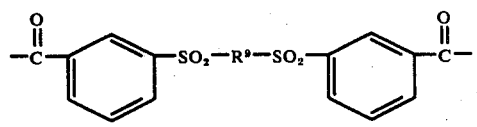

where Ar is an arylene group such as phenylene, preferably m-phenylene, 2,4-tolylene, 4,4'-biphenylene etc., and R$^9$ is a heterocyclic group as exemplified by 1,4-piperazinylene, 2,5-dimethyl-1,4-piperazinylene and the like;

and E has the structure —G—R$^{10}$—G wherein —G—

—O—, or (NH)$_m$ and is selected to insure the presence of recurring —SO$_2$N(H)$_m$— groups in the polymer backbone, m is 0 or 1, and —R$^{10}$— is an aliphatic or aromatic organic residue of a diol or a diamine when m is 1, formed by removal of the two hydroxy, amino or hydrazino groups on the respective organic diol, diamine or dihydrazide compound as exemplified by ethylene, cyclohexylenedimethylene, tetramethylene, hexamethylene, ethylenebis(oxycarbonyl-p-phenylene), 2,2-isopropylidenebis(p-phenyleneoxyethyleneoxycarbonyl-p-phenylene) and the like.

It is to be understood that these condensation polymers can also contain recurring —$D^1$— and —$E^1$— units wherein the recurring —$E^1$— units are one or a plurality of units, each of which conforms to the structure specified for —E—, and —$D^1$— is one or a plurality of units selected from those specified for —D— or from those having the structure —J—$R^{11}$—J— wherein J is:

or —$SO_2$— and $R^{11}$ is the residue of an aliphatic or aromatic dicarboxylic acid or disulfonic acid formed by removal of the two acid groups.

Other useful polymers are those comprising recurring units which conform to Structure II.

   (II)

wherein:
A. X is the backbone of a polymer including for example an addition polymer backbone;
B. $G^1$ is a sulfonamido group

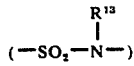

appended to $R^{12}$ through either the sulfur or nitrogen atom;
C. $R^{12}$ is a linking group between the sulfonamido group, $G^1$, and the polymer backbone, X, such as the atoms necessary to complete an aromatic ring in the polymer backbone:

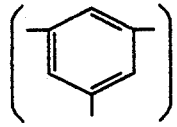

or an aromatic group, e.g., phenylene, a carbonyliminophenylene group:

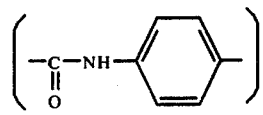

and the like; and
D. $R^{13}$ is a hydrogen atom, or aliphatic or aromatic group, for example, methyl, phenyl, tolyl and the like.

The vinyl addition polymers can also contain recurring units derived from vinyl monomers such as styrene, 4-methylstyrene and the like, and especially acrylic monomers such as acrylic esters such as methyl methacrylate, ethyl acrylate, etc.

A particularly useful class of sulfonamide polymers is that in which the polymer has at least one repeating unit selected from the group consisting of:

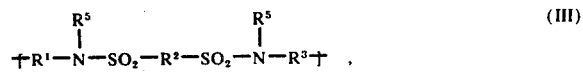   (III)

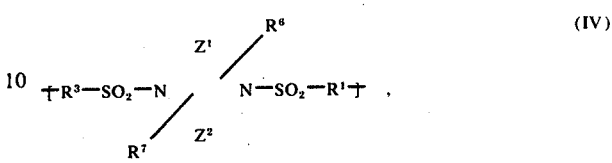   (IV)

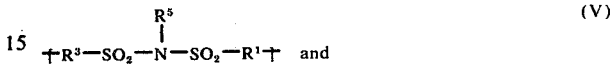   (V) and

   (VI)

wherein:
A. $R^1$ is a member selected from the group consisting of:
1. a substituted or unsubstituted saturated carbocyclic or aromatic ring containing from 5 to 10 carbon atoms in the ring, such as an alicyclenealkylene or alicyclenebis(oxyalkylene) radicals, for example, cycloheptylenemethylene, cyclohexylenedimethylene and the like;
2. a substituted or unsubstituted alkylene radical containing from 1 to 10 carbon atoms, for example, methylene, ethylene, propylene, butylene, phenylethylene, dimethylpropylene and the like;
3. an oxycarbonylphenylene radical; and
4. the —NH— radical;
B. $R^2$ is a saturated carbocyclic or aromatic ring such as a substituted or unsubstituted arylene radical containing from 5 to 10 carbon atoms, for example, phenylene, naphthylene and the like; the substituents on the aromatic carbons being, for example, any one or two of an alkyl radical having from 1 to 4 carbon atoms; a halide; a phenyl; an acyl or alkoxy radical having from 1 to 4 carbon atoms in the alkyl portion, such as acetyl, butyryl, methoxy, ethoxy and the like; and an alkylthio radical, for example, ethylthio, methylthio, butylthio and the like;
C. $R^3$ is a member selected from the group consisting of:
1. an alkyleneoxycarbonylphenylene radical having from 1 to 5 carbon atoms in the alkylene function, for example, methyleneoxycarbonylphenylene, ethyleneoxycarbonylphenylene and the like;
2. a carbonylimino radical;
3. a nitrogen-carbon bond when $R^1$ is other than an oxycarbonylphenylene or the imino radical —NH—; and
4. an α-iminocarbonyl-ω-carbonylalkylene radical when $R^1$ is an imino radical and $R^1$ and $R^3$ are each connected to a nitrogen atom, for example α-iminocarbonyl-β-carbonylalkylene, α-iminocarbonyl-γ-carbonylalkylene and the like;

D. $Z^1$ and $Z^2$ are the same or different, and are each the number of atoms necessary to complete a heterocyclic group, for example, methylene, propylene, and the like;

E. $R^6$ and $R^7$ are the same or different and can be a hydrogen atom or a methyl radical joined to one of the carbon atoms, so as to form with $Z^1$ and $Z^2$ 2,5-dimethylpiperazinylene and the like;

F. $B^4$ is an alkylene radical containing from 1 to 5 carbon atoms, for example, methylene, ethylene, propylene, butylene and the like; or a terephthalate or an isophthalate radical;

G. $R^5$ is methyl or a hydrogen atom;

H. L is a member selected from the group consisting of a carbon-nitrogen bond, a phenyl linked to the repeating unit in the ortho or para positions, and carbonyl;

I. M is a member selected from the group consisting of the amino radical $-NH_2$, an alkyl group containing from 1 to 10 carbon atoms, for example, methyl, ethyl, propyl, butyl and the like, and a methyl-substituted or unsubstituted aryl group containing from 6 to 10 carbon atoms, for example, phenyl, naphthyl and the like;

J. Q is an alkylene radical containing from 2 to 5 carbon atoms, for example, ethylene, propylene, butylene and the like when $R^4$ is isophthalate or terephthalate; and otherwise is a chemical bond; and K. T is a substituted or unsubstituted saturated carbocyclic or aromatic ring containing from 5 to 10 carbon atoms in the ring, such as an alicyclenedialkylene or alicyclenebis(oxyalkylene) radical, for example, cycloheptylenemethylene, cyclohexylenedimethylene and the like, the aromatic ring being linked to the repeating unit in the ortho or para positions; a substituted or unsubstituted alkylene radical containing from 1 to 10 carbon atoms, for example, methylene, ethylene, propylene, butylene, phenylethylene, dimethylpropylene and the like; or a nitrogen-to-sulfur bond when M is other than an amino radical.

The substituents of the substituted alkylene radical referred to in clauses (A)2.and (K) above are selected from the groups consisting of 1. an alkyl radical containing from 1 to 4 carbon atoms, and 2.

The members of such particularly useful class of binders can be a homopolymer of the delineated repeating unit, or a copolymer of the delineated repeating unit with a different one of the above repeating units constituting the remaining part of the polymer.

It will be appreciated that the nomenclature used in the above naming of a particularly useful class of polymers describes only a repeating unit characteristic of the novel binder and of that portion which is particularly suited to forming improved vesiculating elements. The nomenclature is not intended to imply that the polymers are derived from monomers of the named radicals as condensable materials.

Included within the above particularly useful class of polymers are poly(cyclohexylenedimethylene-toluene-2,4-disulfonamide), poly(hexamethylene-1,3-benzenedisulfonamide), poly(hexamethylene-toluene-2,4-disulfonamide), poly[ethylene toluene-2,4-bis(p-sulfonamidobenzoate)], poly(tetramethylene-5-methylsulfonamidoisophthalate), poly[N-(4-vinylphenyl)-methanesulfonamide], poly(N-methacryloyl-p-toluenesulfonamide), poly(tetramethylenedicarbonyl-1-toluene-2,4-disulfonhydrazide), poly(1,4-cyclohexylenedimethylene-1,4-cyclohexanedisulfonamide), poly(trimethylene-1-methyl-2,4-benzenedisulfonamide), poly(1,4-cycloheptylenemethylene-1-methoxy-3,6-naphthalenedisulfonamide), poly[trimethylene methylthiobenzene-2,4-bis-(p-N-methylsulfonamidobenzoate)], poly(2-acrylamidocyclohexane-N-hexylsulfonamide), and poly(ethylene 2-methylhexahydropyrimidinylenebissulfonyl-m-benzoate).

The properties of the following representative binders further illustrate the invention. The inherent viscosities noted are in deciliters/gram, measured for a 0.25% solution in dimethylformamide. λ max was determined by measuring ultraviolet absorption peaks for each polymer in a Beckman model DB spectrophotometer, after dissolving the polymer in either spectrographic grade ethanol, or spectrographic grade methoxyethanol, and by visually examining the polymer coating to ascertain that no significant absorption ocurs in the visible spectrum, i.e. in the range 400 nm to 750 nm. The units set forth are recurring units of the polymer.

Binder 1

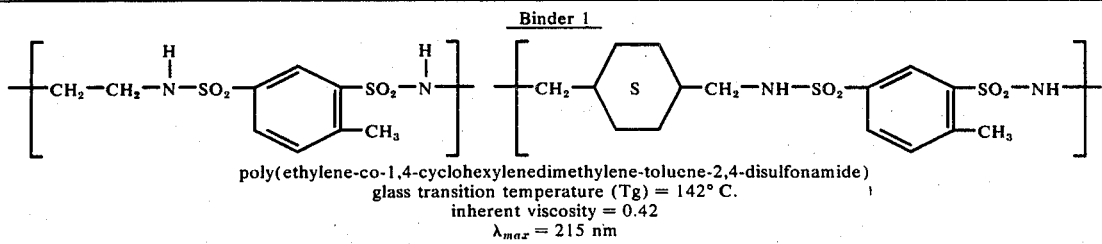

poly(ethylene-co-1,4-cyclohexylenedimethylene-toluene-2,4-disulfonamide)
glass transition temperature (Tg) = 142° C.
inherent viscosity = 0.42
$\lambda_{max} = 215$ nm Binder 2

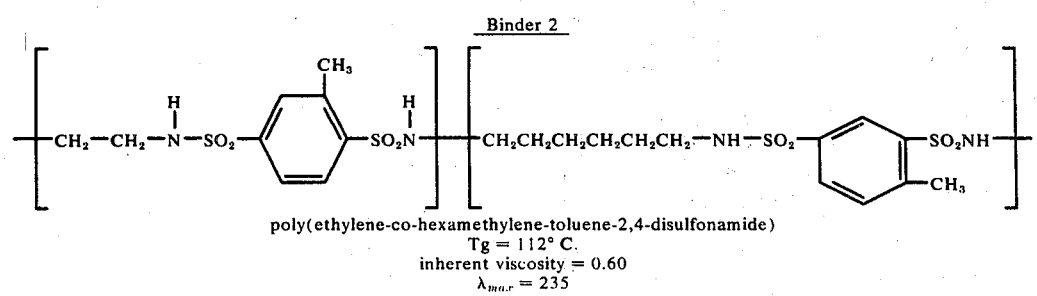

poly(ethylene-co-hexamethylene-toluene-2,4-disulfonamide)
Tg = 112° C.
inherent viscosity = 0.60
$\lambda_{max} = 235$ Binder 3

-continued

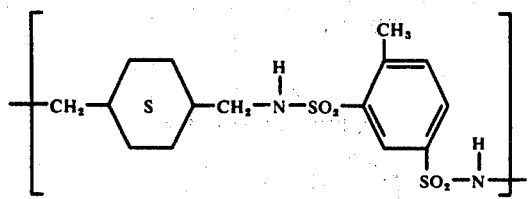
poly(cyclohexylenedimethylene-toluene-2,4-disulfonamide)
Tg = 130° C.
inherent viscosity = 0.35
$\lambda_{max}$ = 231

Binder 4

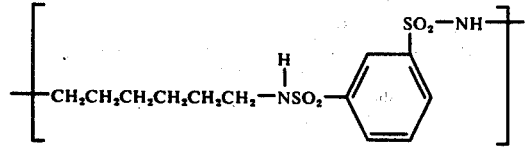
poly(hexamethylene-1,3-benzenedisulfonamide)
Tg = not available
inherent viscosity = 0.94
$\lambda_{max}$ = 231

Binder 5

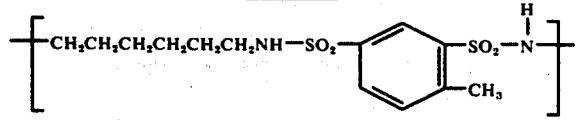
poly(hexamethylene-toluene-2,4-disulfonamide)
Tg = 90° C
inherent viscosity = 1.6
$\lambda_{max}$ = 221

Binder 6

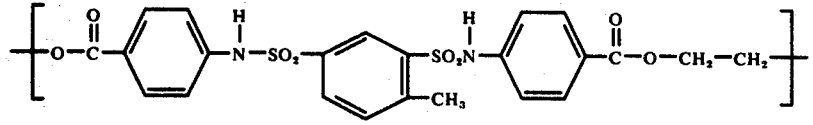
poly[ethylene toluene-2,4-bis(p-sulfonamidobenzoate)]
Tg = 144° C
inherent viscosity = 0.13
$\lambda_{max}$ = 267

Binder 7

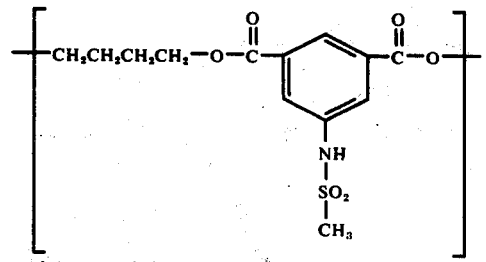
poly(tetramethylene 5-methylsulfonamidoisophthalate)
Tg = 103° C
inherent viscosity = 0.09
$\lambda_{max}$ = 217

Binder 8

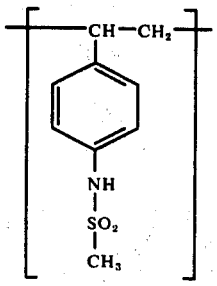
poly[N-(4-vinylphenyl)methanesulfonamide]
Tg = 176° C inherent viscosity = not available
$\lambda_{max} = 220$

Binder 9

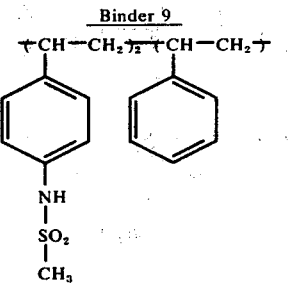

poly[styrene-co-N-(4-vinylphenyl)methanesulfonamide)]
Tg = 154° C
inherent viscosity = not available
$\lambda_{max} = 218$

Binder 10

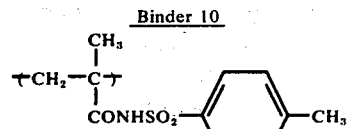

poly(N-methacryloyl-p-toluenesulfonamide)
$\lambda_{max} = 232$

Binder 11

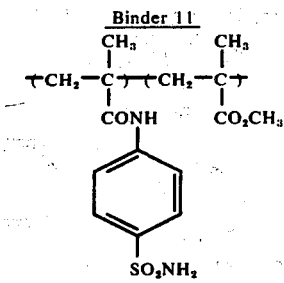

poly(N⁴-methacryloylsulfanilamide-co-methyl methacrylate)
$\lambda_{max} = 217$

Binder 12

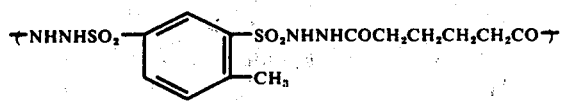

poly(tetramethylenedicarbonyl-1-toluene-2,4-disulfonylhydrazide)
$\lambda_{max} = 222$

Binder 13

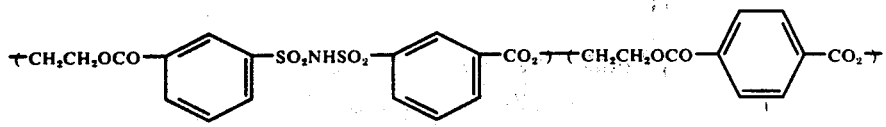

poly[ethylene 3,3'-(iminodisulfonyl)dibenzoate-co-terephthalate]
$\lambda_{max} = 237$

Binder 14

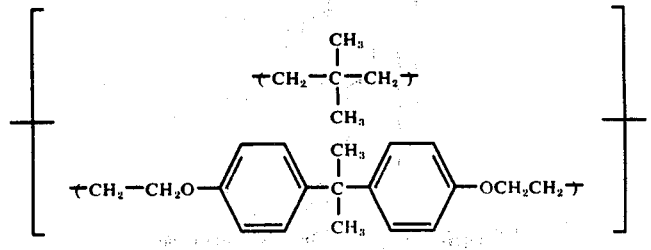

-continued

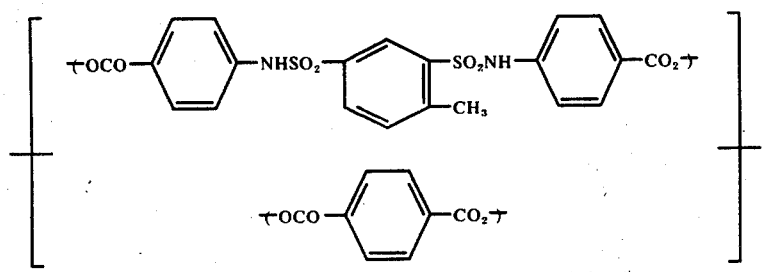

poly[neopentyl-co-4,4'-isopropylidenebis(phenoxyethylene) toluene-2,4-bis(p-sulfonamidobenzoate)-co-terephthalate]
$\lambda_{max} = 228$
Binder 15

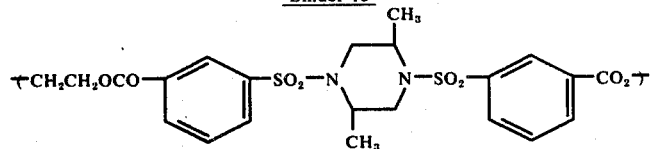

poly[ethylene 2,5-dimethyl-1,4-piperazinylenebis(sulfonyl-m-benzoate)]
$\lambda_{max} = 242$ Binder 14 is representative of the class of binders having the formula

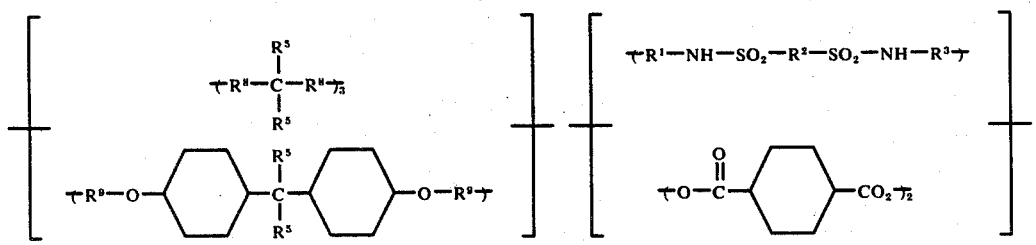

wherein:
$R^1$ is a member selected from the group consisting of:
1. a substituted or unsubstituted carbocyclic or aromatic ring containing from 5 to 10 carbon atoms in the cyclic ring;
2. a substituted or unsubstituted alkylene radical containing from 1 to 10 carbon atoms;
3. an oxycarbonylphenylene radical; and
4. an imino radical;
$R_2$ is a saturated carbocyclic ring or a substituted or unsubstituted aromatic ring, the ring containing from 5 to 10 carbon atoms;
$R^3$ is a member selected from the group consisting of:
1. an alkyleneoxycarbonylphenylene radical wherein the number of carbon atoms in the alkoxy function is from 1 to 5;
2. a carbonylimino radical;
3. a nitrogen-carbon bond when $R^1$ is other than an oxycarbonylphenylene or an imino radical; and 4. an $\alpha$-iminocarbonyl-$\omega$-carbonylalkylene radical when $R^1$ is an imino radical and $R^1$ and $R^3$ are each connected to a nitrogen atom;
$R^5$ is methyl or a hydrogen atom; and
$R^8$ and $R^9$ are each an alkylene group containing from 1 to 5 carbon atoms.

Still other sulfonamide polymers found to meet the requirements discussed above are those having the general formula

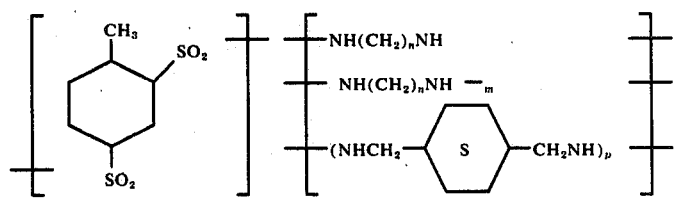

where $n$ is a positive integer from 2 to 12; $m$ is zero or one; and $p$ is 0 when $m$ is other than 0, and is 1 when $m$ is 0. Hereinafter, this class of polymers is arbitrarily described as the "A" class.

The above binders, with the exception of Binders 8–11 and 14, are polymers which can be prepared by known processes. The following preparations are representative only:

Binder 5 can be prepared by adding a solution of 28.8 g. (.100 mole) of 1-methyl-2,4-benzenedisulfonyl chloride in 35 ml. of tetrahydrofuran to a stirred suspension of 19 g. (0.25 mole) of calcium hydroxide in a solution of 11.6 g. (0.100 mole) of hexamethylenediamine and 120 ml. of tetrahydrofuran. The mixture is heated at reflux for an hour and filtered. The filtrate is diluted with acetone and poured into methanol to precipitate the polymer. The polysulfonamides of Binders 1–4 can be made in an analogous manner.

Binder 6 can be prepared in the following manner: The intermediate, N,N'-bis(p-carbomethoxyphenyl)-toluene-2,4-disulfonamide), for this polymer can be made by treating methyl p-aminobenzoate in pyridine with toluene-2,4-disulfonyl chloride. The reaction mixture is poured into water to precipitate the product which is recrystallized from a mixture of 2-butanone, ethanol, and water to give a melting point of 219°–220° C. The polymer is then made by ester interchange of this dimethyl ester with ethylene glycol at 200° C in the presence of zinc acetate and antimony trioxide followed by condensation of 200° C, 0.5 mm.

Binder 7 was prepared from the monomer, dimethyl 5-methylsulfonamidoisophthalate, which in turn can be made by treating dimethyl 5-aminoisophthalate with methanesulfonyl chloride in pyridine. The product, following recrystallization from methanol, melted at 194°–197° C. The dimethyl ester was interchanged with excess tetramethylene glycol at 190° C in the presence of titanium tetrabutoxide. Polymerization was conducted under a vacuum of 1 mm at 200° C.

Binder 13 was prepared by combining eight grams of ethylene glycol, 8.7 g of dimethyl 3,3'-[(sodioimino)-disulfonyl]-dibenzoate (Caldwell and Jones, U.S. Pat. No. 3,546,180), and 3.9 g of dimethyl terephthalate with a few milligrams of zinc acetate and a drop of titanium tetrabutoxide. Ester interchange was conducted at 190° C and polymerization was conducted under vacuum at 230° C. The polymer was dissolved in 150 ml of water and precipitated by the addition of an equal volume of 5% hydrochloric acid. Reprecipitation of the polymer from water was repeated two times. The sodium content of the product was less than 0.02%.

Binder 15 was prepared as follows: Trans-2,5-dimethylpiperazine in water at 50° C was treated with slightly more than two molar equivalents of m-chlorosulfonylbenzoic acid and five molar equivalents of aqueous sodium hydroxide. Acidification gave 1,4-bis(m-carboxyphenylsulfonyl)-2,5-dimethylpiperazine which was recrystallized from aqueous ethanol. The dimethyl ester was made by boiling the acid for 24 hours in methanol to which some hydrogen chloride has been added. Recrystallization from 2:1 dioxane:water gave a product which melted at 233°–227° C. Anal. Calc'd for $C_{22}H_{26}N_2O_8S_2$: C, 51.7; H, 5.1; N, 5.5. Found: C, 51.6; H, 5.4; N, 5.7. The polymer was then made from this ester and ethylene glycol as described for Binder 6.

With regard to Binders 8 and 9, there are homopolymers and copolymers containing N-(vinylphenyl)sulfonamide units. As disclosed in copending U.S. Application Ser. No. 541,678 filed concurrently herewith by Kotlarchik, Minsk and Fletcher, entitled "Sulfonamide Compounds and Polymers Derived Therefrom", which is commonly owned with the instant application, the copolymer form can be prepared by copolymerizing a sulfonamide monomer with at least one other ethylenically unsaturated polymerizable monomer which forms addition polymers such as vinyl esters, amides, nitriles, ketones, halides, etheres, $\alpha$-$\beta$-unsaturated acids or esters thereof, olefins, diolefins and the like, as exemplified by acrylamide, N-substituted acrylamide such as N,N-dimethylacrylamide and N-isopropylacrylamide, methacrylamides, methacrylonitrile, styrene, $\alpha$-methylstyrene, vinyl chloride, methyl vinyl ketone, fumaric maleic and itaconic esters, 2-chloroethyl vinyl ether, acrylic acid, acrylic and methacrylic esters such as methyl acrylate, ethyl methacrylate, n-butyl acrylate and phenyl methacrylate, sodium methacryloxyloxyethyl sulfate, methacrylic acid, dimethylaminoethyl methacrylate, methylene group-containing monomers such as 2-acetoacetoxyethyl methacrylate, 6(vinylphenyl)-2,4-hexanedione, ethyl acryloylacetate and the like, sulfonates such as 3-acryloyloxypropane-1-sulfonic acid, sodium salt, 2-acrylamido-2-methylpropane-1-sulfonic acid, 4,4,9-trimethyl-8-oxo-7-oxa-4-azonia-9-decene-1-sulfonate, N-vinylsuccinamide, N-vinylphthalimide, N-vinylpyrazolidone, vinylpyridine, vinylimidazole, butadiene, isoprene, vinylidene chloride, ethylene and the like.

The copolymer for these binders desirably contains from about 70 to about 100% by weight of N-(vinylphenyl)sulfonamide units and from about 0% by weight to about 30% by weight of other units depending upon the particular monomer used. Some examples of copolymers useful herein include poly[N-(vinylphenyl)-methanesulfonamide-co-acrylamide], poly[N-(vinylphenyl)methanesulfonamide-co-N-isopropylacrylamide], poly[N-(vinylphenyl)methanesulfonamide-co-vinylpyridine], poly[N-(vinylphenyl)methanesulfonamide-co-styrene], poly[N-(vinylphenyl)methanesulfonamide-co-n-butyl acrylate], poly[N-(vinylphenyl)-methanesulfonamide-co-6-(m- and p-vinylphenyl)-2,4-hexanedione) and the like.

Alternatively, the monomer can be homopolymerized.

Considering specifically the Binders 8 through 11, Binder 8 was thus prepared as follows:

An amount of fifty grams of p-vinylaniline (0.42 moles) was dissolved in 250 ml of dry pyridine in a reaction flask equipped with a stirrer, reflux condenser, and dropping funnel. The solution was chilled to 0° C. An amount of fifty grams of methanesulfonyl chloride (0.044 moles) was added dropwise to the reaction solution over a one hour period, and stirring was continued for one hour after the addition was complete. The reaction mixture was poured into 4 liters of dilute hydrochloric acid. The crude N-(4-vinylphenyl)methanesulfonamide precipitated as a crude red product. The solid was collected and washed with water, and the crude product, after drying, was redissolved in a 50/50 mixture of toluene and hexane. The solution was decolorized with carbon and the product crystallized to recover the product. A yellow needle crystalline product was obtained that had a sharp melting point at 97° C. The crystalline N-(4-vinylphenyl)methanesulfonamide was polymerized as follows: An amount of 10 grams was dissolved in 5 ml of dimethyl sulfoxide in a round bottom reaction flask. To the reaction solution, 0.5% by weight of azobisisobutyronitrile was added, and the solution was stirred overnight at 65° C. The reaction solution was next poured into methanol to precipitate the crude polymer, and the precipitated product was washed with methanol and dried. The product was redissolved in acetone/1% water and reprecipitated in a large volume of water. The product after washing and drying weighed 8.4 g.

Binder 9 was prepared as follows: An amount of 36 g of styrene was dissolved in 350 ml of dimethylsulfoxide along with 1.8 g of azobisisobutyronitrile and 144 g of 4-vinylmethanesulfonanilide. The polymerization was carried out by heating to 65° C under $N_2$ for 17 hours.

The polymer was purified by double precipitation. The dimethylsulfoxide reaction mixture was poured into isopropanol to initially precipitate the polymer. The precipitate was filtered and washed with isopropanol. The polymer was next redissolved in a 50/50 mixture of acetone and methanol and reprecipitated in isopropanol. The doubly precipitated polymer was filtered, washed and dried. 120 g of a white amorphous product was obtained.

Binder 10 was prepared from N-methacryloyl-p-toluenesulfonamide as the monomer, which had a melting point of 152°–154° C and was itself prepared as described by Heyboer and Staverman, *Red. Trav. Chim.*, 69, 878 (1950). It was polymerized in dioxane at 60° with azobisisobutyronitrile as initiator. The polymer was recovered by precipitation in methanol.

Binder 11 was copolymerized from $N^4$-methacryloylsulfanilamide as the monomer, m.p. 249°–252° C, which was made by the method of Caldwell, U.S. Pat. No. 2,566,162. It was copolymerized in a 2:1 weight ratio with methyl methacrylate at 60° in dimethylformamide with azobisisobutyronitrile as initiator, and recovered by precipitation in methanol.

Binder 14 was made in the same manner as described for Binder 6 using 5 g of N,N'-bis(p-carbomethoxyphenyl) toluene-2,4-disulfonamide, 3.8 g dimethyl terephthalate, 4.8 g 4,4'-isopropylidenebisphenoxyethanol, and 5.2 g neopentyl glycol. This polymer had a sulfur content of 4.7% by weight.

Imaging Element

The composite imaging element is prepared from the above binders by coating a layer of a solution comprising the binder, vesiculating agent and other desired addenda upon any suitable support, using conventional coating techniques. The support is preferably treated prior to coating with a conventional subbing material such as a terpolymer of vinylidene chloride, acrylonitrile and vinyl chloride. Suitable solvents for the coating include mixtures of acetone and methoxyethanol, and also the solvents 2-methoxyethanol, 4-butyrolactone and N,N-dimethylformamide. The binder concentration in the solution can be between about 5 and about 25%. Typically, the solution is coated onto the support by such means as whirler coating, brushing, doctor-blade coating, hopper coating and the like. The amount of solids should be between about 0.2 and about 0.8 mg/cm² of support. Thereafter the solvent is evaporated. Other exemplary coating procedures are set forth in the *Product Licensing Index*, Vol. 92, Dec., 1971, publication 9232, at p. 109. Coating aids can be incorporated into the coating composition to facilitate coating as disclosed on p. 108 of the *Product Licensing Index* publication. It is also possible to incorporate antistatic layers and/or matting agents as disclosed on this page of the *Product Licensing Index* publication. Plasticizers can be incorporated to modify the coatability or flexibility of the binder, if desired. Increased sensitivity can be achieved by certain conventional addenda, at least some of which function as prenucleating agents which form sites for the gas bubbles, insuring a finer grain pattern. Examples of such prenucleating agents include waxes such as are taught in U.S. Pat. No. 3,355,295 to Priest. Finely divided pigment having an index of refraction approximately equal to that of the binder also increases the sensitivity, as does exposure to high humidity.

The prepared imaging element is then imagewise exposed to ultraviolet light or visible light containing a strong ultraviolet component, such as is obtained from mercury arc lamps. Development is achieved by heating the exposed element for a time and at a temperature sufficient to expand the $N_2$ gas within the exposed portion into vesicules. When the temperature of development is between about 90° C and about 140° C, a few seconds of heating suffices.

If desired, the unexposed portion of the element thereafter can be conventionally flash-exposed and stored at a temperature and for a time sufficient to allow the predominant weight portion of the gas generated by said brief exposure to diffuse out of the element. Typically storage can be for several hours at a temperature below 43° C.

The following examples further illustrate the preparation and use of the imaging element of the invention, incorporating the binders described above.

EXAMPLE 1

A quantity of 27 grams of binder 1 was dissolved in a mixture of 72 g of acetone and 72 g of methoxyethanol by stirring and gently heating. A quantity of 2.05 g of p-(N,N-diethylamino)benzenediazonium fluoroborate was dissolved in the polymer solution at room temperature to serve as the light-sensitive vesiculating agent. The clear lacquer solution was coated at 57° C onto a 4 mil poly(ethylene terephthalate) film support and dried at 57° C to remove residual solvent.

A sample of the above element was exposed to a 125 watt undoped mercury arc spaced about three inches from the film, through an image-bearing transparency, for 18 seconds. The image was developed by heating the sample for three seconds at 120° C, and had a specular density of 1.70.

EXAMPLE 1A

A sample of an element identical to that of Example 1 was exposed to air at 100° F and 94% relative humidity for 10 minutes and then exposed and developed as described above. The film speed after exposure to high humidity was increased by 0.45 Log E, showing spontaneous nucleation by exposure to high humidity.

EXAMPLE 2

One gram of Binder 2 was dissolved in nine grams of 2-methoxyethanol by stirring and gentle heating. A quantity of 100 milligrams of 2-carbazido-α-naphthol was dissolved in the dope to act as a light-sensitive vesiculating agent. The brilliant clear solution was coated onto a four mil poly(ethylene terephthalate) film support at 45° C. The temperature was then raised to 57° C and a strong current of warm air was passed over the film to remove the solvent.

The imaging element was exposed as described in Example 1 and was developed by heating the sample for three seconds at 95° C. An image was obtained that had a density of 1.75.

EXAMPLE 3

A quantity of 1.5 grams of Binder 3 was dissolved in a mixture of 4.25 g of acetone and 4.25 g of 2-methoxyethanol by stirring and gentle heating. A quantity of 164 milligrams of p-(N,N-diethylamino)benzenediazonium fluoroborate was added at room temperature, with stirring, to the polymer solution to act as a light-sensitive vesiculating agent. The clear solution was coated onto a four mil clear poly(ethylene terephthalate) film support at 45° C. The film was then dried by passing a strong current of warm air over the film.

The element was exposed as described in Example 1 and the image was developed by heating the sample for three seconds at 115° C. An image was obtained that had a density of 1.8.

EXAMPLE 4

A quantity of 1.5 grams of Binder 4 was dissolved in 8.25 grams of N,N-dimethylformamide by stirring and gentle heating. A quantity of 165 milligrams of p-(N,N-diethylamino)benzenediazonium fluoroborate was added as a light-sensitive agent. The diazo salt was dissolved in the polymer solution by stirring at room temperature. The clear solution was coated on four mil poly(ethylene terephthalate) film support at 45° C. The film was dried by increasing the temperature to 65° C while passing a stream of air over the surface.

The image element was exposed as described in Example 1 and was developed by heating the sample for three seconds at 90° C. An image was obtained that had a density of 1.80. The unexposed area of the film had a density of 0.06.

EXAMPLE 5

One gram of Binder 5 was dissolved in six grams of dimethylformamide along with seventy-five milligrams of 2-carbazido-α-naphthol by warming and stirring at room temperature. The clear solution of the polymer and vesiculator was coated on four mil poly(ethylene terephthalate) film support at 45° C. The film was dried by increasing the temperature to 65° C while passing a stream of air over the surface.

The element was exposed as described in Example 1 and the image was developed by heating the sample for three seconds at 90° C. An image was obtained that had sharp edges and a density of 2.0.

EXAMPLE 6

A quantity of 1.5 grams of Binder 6 was dissolved in 8.50 g of acetone along with 0.165 g of p-(N,N-diethylamino)-benzenediazonium fluoroborate. A clear solution of the polymer and light-sensitive agent was formed by stirring at room temperature. The clear solution was coated on four mil poly(ethylene terephthalate) film support at 45° C. The film was dried by increasing the temperature to 65° C while passing a stream of air over the surface.

The photographic element so formed was exposed as described in Example 1 and developed by heating to 100° C for 1.5 seconds. An image was obtained that had a density of 2.10. The unexposed area was transparent and had a measured density of 0.06.

EXAMPLE 7

Binder 7 (0.75 grams) was dissolved in 8.50 g of N,N-dimethylformamide. A brilliant clear viscous solution was formed by stirring at slightly elevated temperatures. A quantity of 75 milligrams of p-(N,N-diethylamino)benzenediazonium fluoroborate was dissolved in the polymer solution to serve as a vesiculating agent. The clear solution was coated on a four mil poly(ethylene terephthalate) film support at 45° C. The film was dried by increasing the temperature to 65° C.

The photographic element so formed was exposed as described in Example 1 and developed by heating to 100° C for 2 seconds. A vesicular image was obtained that had a density of 2.0. The unexposed area was transparent and had a density of 0.06.

EXAMPLE 8

One gram of Binder 8 was dissolved in nine grams of 2-methoxyethanol by stirring at room temperature. A quantity of 75 milligrams of 2-carbazido-α-naphthol was dissolved in the polymer solution by stirring at room temperature. The solution of polymer and vesiculating agent was coated on a four mil poly(ethylene terephthalate) backing layer. The film was heated under a strong air current to remove solvent, and the photographic element was exposed in Example 1. Following exposure, the film was developed by heating for three seconds at 140° C. An image appeared white by reflected light and had a density of 1.5.

EXAMPLE 9

A solution was prepared containing 9.0 g of methoxyethanol and 10 g of the copolymer of N-(4-vinylphenyl)methanesulfonamide with styrene. The styrene monomer constituted 20% of the polymer weight. A quantity of 75 milligrams of 2-carbazido-α-naphthol was dissolved in the polymer solution along with 10 mg of carnauba wax as a prenucleating agent. The lacquer solution was coated on a four mil poly(ethylene terephthalate) backing layer. The film was warmed to 55° C to allow the solvent to evaporate. The dried film was exposed imagewise as described in Example 1. The latent image was developed by heating the film for three seconds at 140° C. An image was obtained which had a density of 1.2.

EXAMPLE 10

A 12% by weight solution was made of Binder 10 in a mixture of equal parts of acetone and methoxyethanol. To it was added as vesiculating agent p-(N,N-diethylamino)benzenediazonium fluoroborate. The solution was coated at a wet thickness of six mils on a poly(ethylene terephthalate) film support, and dried, initially at 45° C then at 150° C for 15 seconds.

The film was exposed for seven seconds through an image-bearing transparency to a 400 watt mercury lamp at a distance of three inches. The image was developed by heating the film at 120° C for three seconds. A vesicular image with a blue-green tone was formed.

EXAMPLE 11

An element incorporating Binder 11 was prepared, exposed, and developed as described in Example 10. A good vesicular image resulted.

EXAMPLES 12 – 15

Binders 12–15 were separately incorporated into imaging elements in the manner described for Example 10, and exposed and developed as therein described. Good vesicular images were obtained in each case.

EXAMPLES 16 – 18

To illustrate the improvement obtained by the binder of the invention, a comparison of sensitivities was made among Binder 1 described above, a polyamide binder of the type described in U.S. Pat. No. 3,383,213, and an α-chloroacrylonitrile binder of the type described in U.S. Patent 3,620,743. In the case of Binder 1 of the invention, an imaging element was prepared as described for Example 1. The polyamide binder which was prepared was "Versamide" 940, manufactured by General Mills, a polyamide of ethylenediamine and polymerized unsaturated fatty acid. The imaging element was made in accordance with Example 2 of U.S. Pat. No. 3,383,213. The α-chloroacrylonitrile binder was a mixture of poly-α-chloroacrylonitrile and a copolymer of polyvinylidene chloride/acrylonitrile prepared as taught by Example 9 of U.S. Pat. No. 3,620,743 into an imaging element.

Exposure followed a sequence similar to that of Example 10. Table 1 sets forth the results, using the binder of the invention as the standard.

Table 1

| Example | Binder | Image Results |
|---|---|---|
| 16 | Example 1 of the invention | good image |
| 17 | polyamide | none[1] |
| 18 | poly-α-chloroacrylonitrile | 0.2 log E slower than Example 16 |

[1]Even when development was attempted by varying the temperature between 50° and 150° C., no image resulted.

These examples illustrate the enhanced sensitivity of the binder of the invention.

EXAMPLES 19–41

The elements were prepared as hand coatings by coating the following formulation on poly(ethylene terephthalate):

| | |
|---|---|
| Polysulfonamide of Table 2 | 2.0 g |
| acetone | 7.36 g |
| 2,5-dimethoxy-4(1-morpholino)-benzenediazonium fluoroborate | 0.2 g |
| surfactant | 0.025 g |
| dyes for neutral image | 0.013 g |

These elements were used to demonstrate the usefulness of the "A" class of binder. Relative speed was determined by comparing the example against a control comprising "Microlith 200" vesicular film, manufactured by Kalvar Corp. and incorporating 2,5-diethoxy-4(1-morpholino)benzenediazonium zinc chloride as the vesiculating agent and a copolymer binder of methyl methacrylate, vinylidene chloride and acrylonitrile. The control was exposed and developed under the same conditions as the test samples. λmax was determined in methoxy ethanol solvent, except for Examples 19–22 which were in ethanol. Average contrast was determined by measuring the slope of a straght line drawn between the density values on a D-log E curve at 0.1 above $D_{min}$ and 1.2 above $D_{min}$. Where maximum bubble diameters were found to be bimodal in distribution, both sizes were noted.

The following table sets forth the polymer structure and the results of the element so coated. Variances between coatings using the same binder occurred by reason of polymer cross-linking which tended in some cases to increase the viscosity even to the point of insolubility (Example 24).

Table 2

| Example | Structure | λmax (nm) | Inherent Viscosity | Tg(° C) | Rel. Speed (Δ log E) | Ave. Contrast | Max Bubble Diameter μm |
|---|---|---|---|---|---|---|---|
| 19 | 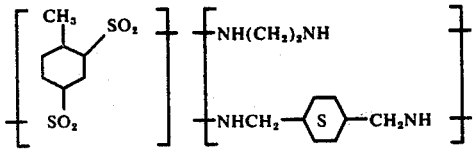 | 284 | not available | not available | 0.72 | 3.5 | 6.7 |
| 20 | 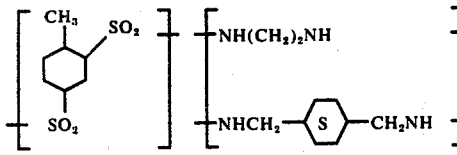 | 284 | 1.11 | 138 | 0.70 | 6.5 | 1.6/6.8 |
| 21 | 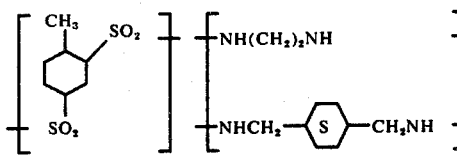 | 284 | 1.22 | 151 | 0.69 | 6.2 | 0.9/5.0 |
| 22 | 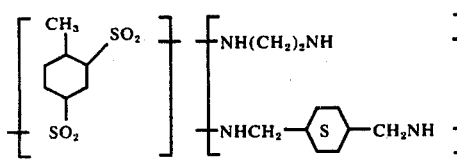 | 284 | 0.85 | 153 | 0.72 | 5.4 | 6.7 |
| 23 | 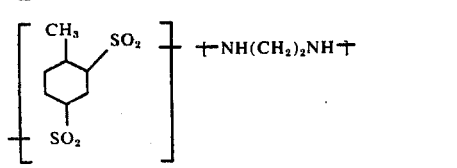 | 285 | 0.88 | 135 | 0.98 | 10.0 | 10.0 |

Table 2-continued

| Example | Structure | $\lambda_{max}$ (nm) | Inherent Viscosity | Tg (°C) | Rel. Speed (Δ log E) | Ave. Contrast | Max Bubble Diameter μm |
|---|---|---|---|---|---|---|---|
| 24 | [CH₃-cyclohexane(SO₂)(SO₂)]—[NH(CH₂)₃NH] | not available | Insoluble | not available | not available | not available | not available |
| 25 | [CH₃-cyclohexane(SO₂)(SO₂)]—[NH(CH₂)₃NH] | 285 | 0.74 | 123 | 0.71 | 7.5 | 8.3 |
| 26 | [CH₃-cyclohexane(SO₂)(SO₂)]—[NH(C₂)₃NH] | 285 | 1.30 | 123 | 0.86 | 5.8 | 0.6 |
| 27 | [CH₃-cyclohexane(SO₂)(SO₂)]—[NH(CH₂)₄NH] | 286 | 1.18 | 95 | 0.81 | 6.4 | 5.0 |
| 28 | [CH₃-cyclohexane(SO₂)(SO₂)]—[NH(CH₂)₄NH] | 286 | 0.70 | 113 | 0.88 | 10.8 | 1.6 |
| 29 | [CH₃-cyclohexane(SO₂)(SO₂)]—[NH(CH₂)₄NH] | 286 | 0.96 | 114 | 0.88 | 10.5 | 3.1/12.5 |
| 30 | [CH₃-cyclohexane(SO₂)(SO₂)]—[NH(CH₂)₅NH] | 285 | 0.54 | 97 | 0.76 | 4.8 | 1.0/7.8 |
| 31 | [CH₃-cyclohexane(SO₂)(SO₂)]—[NH(CH₂)₆NH] | 287 | 0.95 | 92 | 0.72 | 8.0 | 1.6/6.2 |
| 32 | [CH₃-cyclohexane(SO₂)(SO₂)]—[NH(CH₂)ₙNH] | 284 | 0.53 | 64/82 | 0.50 | 7.5 | 13.3 |
| 33 | [CH₃-cyclohexane(SO₂)(SO₂)]—[[NH(CH₂)₂NH][NH(CH₂)₃NH]] | 283 | 1.26 | 126 | 0.92 | 5.8 | 11.7 |

Table 2-continued

| Example | Structure | $\lambda_{max}$ (nm) | Inherent Viscosity | Tg(°C) | Rel. Speed ($\Delta$ log E) | Ave. Contrast | Max Bubble Diameter $\mu$m |
|---|---|---|---|---|---|---|---|
| 34 | [CH₃-C₆H₃(SO₂)(SO₂)]-[NH(CH₂)₂NH]/[NH(CH₂)₄NH] | not available | 1.76 | 115 | 0.80 | 5.8 | 6.7 |
| 35 | [CH₃-C₆H₃(SO₂)(SO₂)]-[NH(CH₂)₂NH]/[NH(CH₂)₅NH] | 285 | 0.67 | 115 | 0.86 | 8.0 | 5.0/16.7 |
| 36 | [CH₃-C₆H₃(SO₂)(SO₂)]-[NH(CH₂)₂NH]/[NH(CH₂)₇NH] | 285 | 0.71 | 97 | 0.81 | 8.6 | 8.3 |
| 37 | [CH₃-C₆H₃(SO₂)(SO₂)]-[NH(CH₂)₂NH]/[NH(CH₂)ₙNH] | 285 | 0.66 | 92 | 0.72 | 12.6 | 10.0 |
| 38 | [CH₃-C₆H₃(SO₂)(SO₂)]-[NH(CH₂)₂NH]/[NH(CH₂)₁₂NH] | 283 | 0.67 | 82 | 0.42 | >13 | 8.3 |
| 39 | [CH₃-C₆H₃(SO₂)(SO₂)]-[NH(CH₂)₃NH]/[NH(CH₂)₆NH] | 285 | 1.16 | 108 | 0.79 | 8.0 | 5.0 |
| 40 | [CH₃-C₆H₃(SO₂)(SO₂)]-[NH(CH₂)₄NH]/[NH(CH₂)₆NH] | 284 | 1.30 | 103 | 0.75 | 8.7 | 6.7 |
| 41 | [CH₃-C₆H₃(SO₂)(SO₂)]-[NH(CH₂)₅NH]/[NH(CH₂)₆NH] | 284 | 0.63 | 90 | 0.63 | 4.4 | 3.3/10.0 |

All of the aforedescribed examples of imaging elements prepared in accordance with the invention had a binder permeability constant for nitrogen in the desired image, namely, about $1 \times 10^{-11}$ to about $1 \times 10^{-15}$ cm³ transmitted per 1 sq. cm. in 1 second at 30° C, for a pressure gradient of 1 cm of Hg per cm of thickness of binder. The examples further evidenced good film forming characteristics, adhesion to the subbed support, good solubility, and a lack or corrosive tendencies. With regard to the last-named property, it is believed that the addition of halogens to the phenyl groups of the repeating unit does not render the binder corrosive, as such halogens are not readily hydrolyzed.

As other examples of the invention, the binders of the invention can be self-supporting and the support eliminated from the element. In such a case, it will be appreciated that the thickness of the coating of the binder is increased slightly to that necessary to replace the thickness of the eliminated support.

Although the invention has been defined in detail with particular reference to certain preferred embodiments thereof, it will be understood that variations and modifications can be effected within the spirit and scope of the invention.

What is claimed is:

1. In an imaging element comprising: I) a support, and on the support an admixture of II) a waterinsoluble, thermoplastic, polymeric binder having a permeability constant for gas ranging from about $1 \times 10^{-11}$ to about 1 × 10⁻¹⁵, and III) a radiation-decomposable vesiculating agent capable of generating a gas upon imagewise exposure; the improvement wherein the binder is a sulfonamide polymer having in the backbone or pendant therefrom, the moiety —SO₂—N<, said polymer having a λmax no greater than about 350 nm in the spectral range of 200 to 750 nm, and at least one repeating unit selected from the group consisting of:

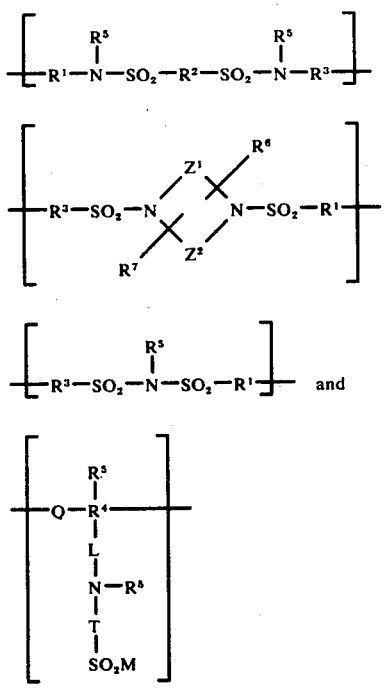

wherein:
A. R¹ is a member selected from the group consisting of:
  1. a substituted or unsubstituted saturated carbocyclic ring containing from 5 to 10 carbon atoms, or a substituted or unsubstituted aromatic ring containing from 6 to 10 carbon atoms in the ring;
  2. a substituted or unsubstituted alkylene radical containing from 1 to 10 carbon atoms;
  3. an oxycarbonylphenylene radical; and
  4. an imino radical;
B. R² is a saturated carbocyclic ring containing from 5 to 10 carbon atoms, or a substituted or unsubstituted aromatic ring containing from 6 to 10 carbon atoms;
C. R³ is a member selected from the group consisting of:
  1. an alkyleneoxycarbonylphenylene radical wherein the number of carbon atoms in the alkylene function is from 1 to 5;
  2. a carbonylimino radical;
  3. in formula (a) only, a nitrogen-carbon bond when R¹ is other than an oxycarbonylphenylene or an imino radical; and
  4. an α-iminocarbonyl -carbonylalkylene radical when R¹ is an imino radical and R¹ and R³ are each connected to a nitrogen atom;
D. Z¹ and Z² are the same or different, and are each the atoms necessary to complete a heterocyclic group;

E. R⁶ and R⁷ are the same or different and can be a hydrogen atom or a methyl radical joined to one of the carbon atoms of Z¹ or Z²;
F. R⁴ is an alkylene radical containing from 1 to 5 carbon atoms or an isophthalate or terephthalate radical;
G. R⁵ is methyl or a hydrogen atom;
H. L is a member selected from the group consisting of a carbon-nitrogen bond, a phenyl linked in the ortho or para positions, and carbonyl;
I. M is a member selected from the group consisting of —NH₂, an alkyl radical containing from 1 to 10 carbon atoms, and a methyl-substituted or unsubstituted aryl radical containing from 6 to 10 carbon atoms;
J. Q is an alkylene radical containing from 2 to 5 carbon atoms when R⁴ is isophthalate or terephthalate and otherwise is a chemical bond; and
K. T is either 1) a substituted or unsubstituted saturated carbocyclic ring containing from 5 to 10 carbon atoms, or a substituted or unsubstituted aromatic ring containing from 6 to 10 carbon atoms in the ring, (2) a substituted or unsubstituted alkylene radical containing from 1 to 10 carbon atoms, or 3) a nitrogen-to-sulfur bond when M is other than —NH₂;
L. the substituents of said substituted aromatic ring of (A) 1), (B), and (K) being selected from the group consisting of:
  1. an alkyl radical containing from 1 to 4 carbon atoms;
  2. a halogen atom;
  3. a phenyl radical;
  4. an acyl radical or an alkoxy radical the alkyl portion of which has from 1 to 4 carbon atoms; and
  5. an alkylthio radical; and
M. the substituents of said substituted alkylene radical of (A) 2) and (K) being selected from the group consisting of:
  1. an alkyl radical containing from 1 to 4 carbon atoms, and
  2. a phenyl radical.

2. The improved element as defined in claim 1 wherein said binder is a copolymer comprising a first repeating unit selected from the group defined in claim 1, copolymerized with a second repeating unit selected from the group defined in claim 1, said second unit being different from said first unit.

3. The improved element as defined in claim 2 wherein said binder is poly(ethylene-co-1,4-cyclohexylenedimethylene-toluene-2,4-disulfonamide).

4. The improved element as defined in claim 3 wherein said agent is selected from the group consisting of 1,4-dicarbazidobenzene, p-(N,N-diethylamino)benzenediazonium fluoroborate, 2-carbazido-α-naphthol, 2,5-dimethoxy-4-morpholinobenzenediazonium hexafluorophosphate.

5. The improved element as defined in claim 2 wherein said binder is poly(ethylene-co-hexamethylene-toluene-2,4-disulfonamide).

6. The improved element as defined in claim 5 wherein said agent is selected from the group consisting of 1,4-dicarbazidobenzene, p-(N,N-diethylamino)benzenediazonium fluoroborate, 2-carbazido-α-napthol, 2,5-dimethoxy-4-morpholinobenzenediazonium hexafluorophosphate.

7. The improved element as defined in claim 1 wherein said agent is selected from the group consisting of 1,4-dicarbazidobenzene, p-(N,N-diethylamino)benzenediazonium fluoroborate, 2-carbazido-α-naphthol, 2,5-dimethoxy-4-morpholinobenzenediazonium hexafluorophosphate.

8. The improved element as defined in claim 2 wherein said binder contains the repeating units:

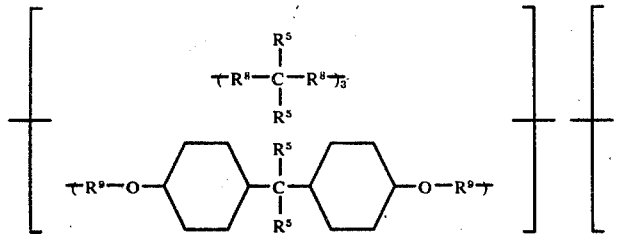 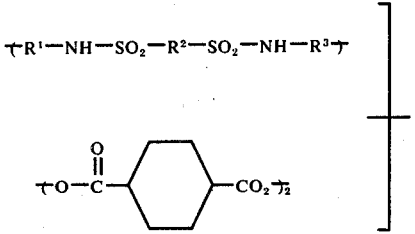

wherein R¹, R², R³ and R⁵ are as defined in claim 1, and R⁸ and R⁹ are each an alkylene group containing from 1 to 5 carbon atoms.

9. In an imaging element comprising: (I) a support, and on the support, an admixture of (II) a water-insoluble thermoplastic, polymeric binder having a permeability constant for gas ranging from about $1 \times 10^{-11}$ to about $1 \times 10^{-15}$, and (III) a radiation-decomposable vesiculating agent capable of generating a gas upon imagewise exposure;

the improvement wherein the binder is a polymer having a repeating unit

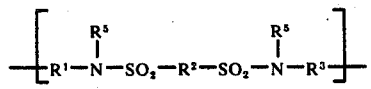

wherein
A. R¹ is a member selected from the group consisting of:
  1. a substituted or unsubstituted saturated carbocyclic ring containing from 5 to 10 carbon atoms, or a substituted or unsubstituted aromatic ring containing from 6 to 10 carbon atoms, or a substituted or unsubstituted aromatic ring containing from 6 to 10 carbon atoms in the ring;
  2. a substituted or unsubstituted alkylene radical containing from 1 to 10 carbon atoms;
  3. an oxycarbonylphenylene radical; and
  4. an imino radical;
B. R² is a saturated carbocyclic ring containing from 5 to 10 carbon atoms, or a substituted or unsubstituted aromatic ring containing from 6 to 10 carbon atoms; and
C. R³ is a member selected from the group consisting of:
  1. an alkyleneoxycarbonylphenylene radical wherein the number of carbon atoms in the alkylene function is from 1 to 5;
  2. a carbonylimino radical;
  3. a nitrogen-carbon bond when R¹ is other than an oxycarbonylphenylene or an imino radical; and
  4. an α-iminocarbonyl-ω-carbonylalkylene radical when R¹ is an imino radical and R¹ and R³ are each connected to a nitrogen atom;
D. the substituents of said substituted aromatic ring of (A) 1) and (B) being selected from the group consisting of:
  1. an alkyl radical containing from 1 to 4 carbon atoms;
  2. a halogen atom;
  3. a phenyl radical;
  4. an acyl radical or an alkoxy radical the alkyl portion of which has from 1 to 4 carbon atoms; and
  5. an alkylthio radical; and E. the substituents of said substituted alkylene radical of (A) 2) being selected from the group consisting of:
  1. an alkyl radical containing from 1 to 4 carbon atoms, and
  2. a phenyl radical.

10. The improved element as defined in claim 9 wherein said binder is a copolymer comprising a first repeating unit selected from the group defined in claim 9, copolymerized with a second repeating unit selected from the group defined in claim 9, said second unit being different from said first unit.

11. The improved element as defined in claim 10 wherein said binder is poly(ethylene-co-1,4-cyclohexylenedimethylene-toluene-2,4-disulfonamide).

12. The improved element as defined in claim 10 wherein said agent is selected from the group consisting of 1,4-dicarbazidobenzene, p-(N,N-diethylamino)benzenediazonium fluoroborate, 2-carbazido-α-naphthol, 2,5-dimethoxy-4-morpholinobenzenediazonium hexafluorophosphate.

13. The improved element as defined in claim 10 wherein said binder is poly(ethylene-co-hexamethylenetoluene-2,4-disulfonamide).

14. The improved element as defined in claim 13 wherein said agent is selected from the group consisting of 1,4-dicarbazidobenzene, p-(N,N-diethylamino)benzenediazonium fluoroborate, 2-carbazido-α-naphthol, 2,5-dimethoxy-4-morpholinobenzenediazonium hexafluorophosphate.

15. The improved element as defined in claim 9 wherein said agent is selected from the group consisting of 1,4-dicarbazidobenzene, p-(N,N-diethylamino)benzenediazonium fluoroborate, 2-carbazido-α-naphthol, 2,5-dimethoxy-4-morpholinobenzenediazonium hexafluorophosphate.

16. A dry process for forming a photographic image, comprising the steps of:
  a. imagewise-exposing a radiation-sensitive photographic element containing, on a support, an admixture of a decomposable radiation-sensitive vesiculating agent capable of generating a gas upon exposure to activating radiation, and a polymeric binder having as a repeating unit one which includes the linkage >N—SO₂— as a portion of the backbone of the polymer or as a pendant moiety and is selected from the group consisting of

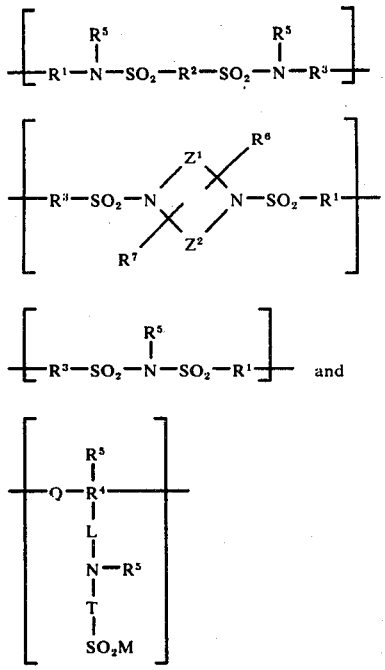

(a), (b), (c), (d)

wherein
A. $R^1$ is a member selected from the group consisting of:
 1. a substituted or unsubstituted saturated carbocyclic ring containing from 5 to 10 carbon atoms, or a substituted or unsubstituted aromatic ring containing from 6 to 10 carbon atoms in the ring;
 2. a substituted or unsubstituted alkylene radical containing from 1 to 10 carbon atoms;
 2. an oxycarbonylphenylene radical; and
 4. an imino radical;
B. $R^2$ is a saturated carbocyclic ring containing from 5 to 10 carbon atoms, or a substituted or unsubstituted aromatic ring containing from 6 to 10 carbon atoms;
C. $R^3$ is a member selected from the group consisting of:
 1. an alkyleneoxycarbonylphenylene radical wherein the number of carbon atoms in the alkylene function is from 1 to 5;
 2. a carbonylimino radical;
 3. in formula (a) only, a nitrogen-carbon bond when $R^1$ is other than an oxycarbonylphenylene or an imino radical; and
 4. an α-iminocarbonyl-ω-carbonylalkylene radical when $R^1$ is an imino radical and $R^1$ and $R^3$ are each connected to a nitrogen atom;
D. $Z^1$ and $Z^2$ are the same or different, and are each the atoms necessary to complete a heterocyclic group;
E. $R^6$ and $R^7$ are the same or different and can be a hydrogen atom or a methyl radical joined to one of the carbon atoms of $Z^1$ or $Z^2$;
F. $R^4$ is an alkylene radical containing from 1 to 5 carbon atoms or an isophthalate or terephthalate radical;
G. $R^5$ is methyl or a hydrogen atom;
H. L is a member selected from the group consisting of a carbon-nitrogen bond, a phenyl linked to the unit in the ortho positions, and carbonyl;
I. M is a member selected from the group consisting of $-NH_2$, an alkyl radical containing from 1 to 10 carbon atoms, and a methyl-substituted or unsubstituted aryl radical containing from 6 to 10 carbon atoms;
J. Q is an alkylene radical containing from 2 to 5 carbon atoms when $R^4$ is isophthalate or terephthalate and otherwise is a chemical bond; and
K. T is a substituted for unsubstituted saturated carbocyclic ring containing from 5 to 10 carbon atoms, or a substituted or unsubstituted aromatic ring containing from 6–10 carbon atoms in the ring; a substituted or unsubstituted alkylene radical containing from 1 to 10 carbon atoms, or a nitrogen-to-sulfur bond when M is other than $-NH_2$;
L. the substituents of said substituted aromatic ring of (A) 1), (B), and (K) being selected from the group consisting of:
 1. an alkyl radical containing from 1 to 4 carbon atoms;
 2. a halogen atom;
 3. a phenyl radical;
 4. an acyl radical or an alkoxy radical the alkyl portion of which has from 1 to 4 carbon atoms; and
 5. an alkylthio radical; and
M. the substituents of said alkylene radical of (A) 2) and (K) being selected from the group consisting of:
 1. an alkyl radical containing from 1 to 4 carbon atoms; and
 2. a phenyl radical; and
 b. developing the exposed element by heating it to a temperature and for a time sufficient to force the gas bubbles formed by the photodecomposition of the agent to expand to form a visible image.

17. The process as defined in claim 16 and further including a step subsequent to said developing step of stabilizing the unexposed portions of the element by uniformly and briefly exposing them to activating radiation and thereafter storing the element at a temperature and for a time sufficient to allow the predominant weight portion of the gas generated by said brief exposure to diffuse out of the element.

18. In an imaging element comprising: I) a support, and on the support, an admixture of II) a water-insoluble thermoplastic, polymeric binder having a permeability constant for gas ranging from $1 \times 10^{-11}$ to about $1 \times 10^{-15}$, and III) a radiation-decomposable vesiculating agent capable of generating a gas upon imagewise exposure;
the improvement wherein the binder is a polymer having as repeating units:

wherein $n$ is a positive integer from 2 to 12; $m$ is 0 or 1; and $p$ is 0 when $m$ is 1, and is 1 when $m$ is 0.

19. An element as defined in claim 18, wherein said binder comprises the repeating units:
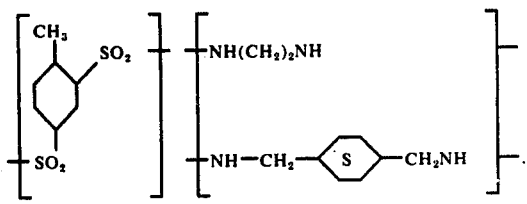
* * * * *

UNITED STATES PATENT AND TRADEMARK OFFICE
CERTIFICATE OF CORRECTION

PATENT NO. : 4,032,344

DATED : June 28, 1977

INVENTOR(S) : George L. Fletcher, Jr., Stewart H. Merrill, and Carl Kotlarchik

It is certified that error appears in the above-identified patent and that said Letters Patent are hereby corrected as shown below:

Column 4, line 31, "-D] [E-" should read -- $\{D\}\{E\}$ --.

Column 6, line 10 "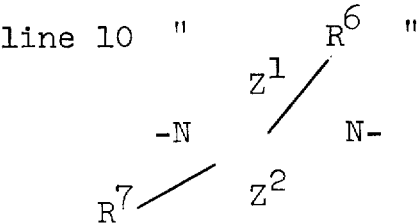"

should read 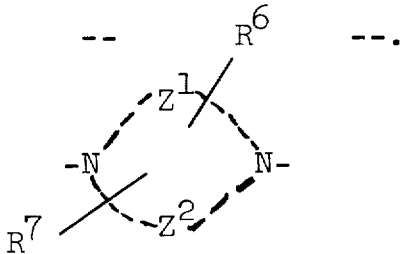

Column 6, line 40, "NH-" should read --imino -NH- --.

Column 7, line 9, "$B^4$" should read --$R^4$--.

Column 8, lines 1 and 2, "1. an alkyl radical containing from 1 to 4 carbon atoms, and 2." should read --1) an alkyl radical containing from 1 to 4 carbon atoms, and 2) a phenyl radical--.

UNITED STATES PATENT AND TRADEMARK OFFICE
CERTIFICATE OF CORRECTION

PATENT NO. : 4,032,344

DATED : June 28, 1977

INVENTOR(S) : George L. Fletcher, Jr., Stewart H. Merrill, and Carl Kotlarchik

It is certified that error appears in the above-identified patent and that said Letters Patent are hereby corrected as shown below:

Columns 13, line 27; 14, line 54; 21, Examples 19-23; 25, lines 1-53; 29, line 7; 32, line 60; and 34, line 5 (structures)

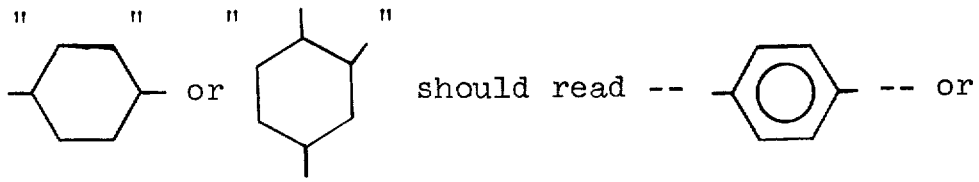 should read -- 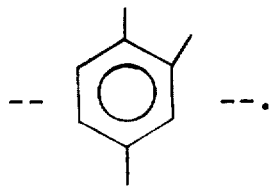 --.

UNITED STATES PATENT AND TRADEMARK OFFICE
CERTIFICATE OF CORRECTION

PATENT NO. : 4,032,344

DATED : June 28, 1977

INVENTOR(S) : George L. Fletcher, Jr. Stewart H. Merrill, and Carl Kotlarchik

It is certified that error appears in the above-identified patent and that said Letters Patent are hereby corrected as shown below:

Column 15, line 48, "233°" should read --223°--.

Column 25, line 62, "or" should read --of--.

Column 26, line 66, "waterinsolu-" should read --water-insolu- --.

Signed and Sealed this

Eighth Day of November 1977

[SEAL]

Attest:

RUTH C. MASON
Attesting Officer

LUTRELLE F. PARKER
Acting Commissioner of Patents and Trademarks